United States Patent [19]
Wouch et al.

[11] Patent Number: 5,302,193
[45] Date of Patent: Apr. 12, 1994

[54] WATERBASED GRAVURE INK AND METHOD OF PRINTING

[75] Inventors: Gerald Wouch, Lisle; Gerald J. Bender, Park Forest; Gary Procknow, Chicago, all of Ill.

[73] Assignee: R. R. Donnelley & Sons Co., Lisle, Ill.

[21] Appl. No.: 994,622

[22] Filed: Dec. 21, 1992

[51] Int. Cl.$^5$ .............................................. C09D 11/08
[52] U.S. Cl. ..................... 106/20 R; 106/22 R; 106/22 H; 106/30 R; 101/170
[58] Field of Search ................ 106/20 R, 30 R, 22 H, 106/22 R; 101/170

[56] References Cited

U.S. PATENT DOCUMENTS

| | | | |
|---|---|---|---|
| 3,846,141 | 11/1974 | Ostergren et al. | 106/22 |
| 4,026,713 | 5/1977 | Sambucetti et al. | 106/19 |
| 4,028,128 | 6/1977 | Robertson | 106/23 R |
| 4,154,618 | 5/1979 | Burke | 106/30 B |
| 4,289,678 | 9/1981 | Calder et al. | 106/30 B |
| 4,402,262 | 9/1983 | Handforth | 106/23 F |
| 4,421,559 | 12/1920 | Owatari | 106/20 |
| 4,460,727 | 7/1984 | Shoji | 524/215 |
| 4,509,982 | 4/1985 | Iijima | 106/23 |
| 4,581,071 | 4/1986 | Akutsu et al. | 106/22 |
| 4,664,708 | 5/1987 | Allen | 106/22 |
| 4,744,826 | 5/1988 | Ijima | 106/20 |
| 4,765,243 | 8/1988 | Schiefer et al. | 101/451 |
| 4,963,188 | 10/1990 | Parker | 106/30 B |
| 4,966,628 | 10/1990 | Amon et al. | 106/30 B |
| 4,976,782 | 12/1990 | Crozer | 106/19 |
| 5,017,224 | 5/1991 | Tomita et al. | 106/22 |
| 5,026,425 | 6/1991 | Hindagolia et al. | 106/22 |
| 5,026,754 | 6/1991 | Pavlin | 106/30 B |
| 5,084,492 | 1/1992 | Pinell et al. | 523/161 |

OTHER PUBLICATIONS

Enright, D.; The Cost Impact of Water Based Publication Gravure Inks; Oct. 2, 1991.
Cotugno, L.; BASF Material Safety Data Sheet; Developmental Water Borne Uncoated Blue Ink; Oct. 5, 1989.
Cotugno, L.; BASF Material Safety Data Sheet; Developmental Water Borne Coated Red Ink; Jun. 22, 1989.
Cotugno, L.; BASF Material Safety Data Sheet; Developmental Water Borne Uncoated Red Ink; Jun. 22, 1989.
Cotugno L.; BASF Material Safety Data Sheet; Developmental Water Borne Yellow Ink; Sep. 28, 1989.
Cotugno, L.; BASF Material Safety Data Sheet; Developmental Water Borne Yellow Ink; Jun. 22, 1989.
Cotugno, L.; BASF Material Safety Data Sheet; Developmental Water Borne Yellow Ink; Jan. 29, 1990.

*Primary Examiner*—Helene Klemanski
*Attorney, Agent, or Firm*—Wood, Phillips, VanSanten, Hoffman & Ertel

[57] ABSTRACT

An improved waterbased gravure ink includes an additive package. The ink exhibits reduced volatile organic compound content and improved printability as compared to conventional waterbased gravure inks. A method of printing using the ink includes the steps of introducing the ink into cells of a printing surface and applying the ink in the cells to a printing substrate, the printing surface being made using about a 120° to 150° diamond and about 120 to about 300 lines per inch.

20 Claims, No Drawings

WATERBASED GRAVURE INK AND METHOD OF PRINTING

TECHNICAL FIELD

This invention is directed to a waterbased gravure ink that includes an additive package that provides improved printing characteristics and a low volatile organic compounds content and to a method of printing with the ink.

BACKGROUND OF THE INVENTION

Gravure is a major commercial printing processes that can be used to print, on a substrate such as paper, anything from newspaper to fine art. Text and images can be printed.

Gravure is an intaglio process wherein ink is transferred to the paper as drops from very small cells that are recessed into a printing surface, e.g., a cylinder or flat plate. The ink drops flow and selectively spread together to print the text or image. If the surface tension of the ink drop is to high, the ink will not spread quick or far enough causing the print to appear rough and grainy.

Gravure is distinguished from other processes such as letterpress printing and lithography. In letterpress printing, ink is transferred to the paper from a raised image. In lithography, the entire printing surface has areas that will print defined by a water repellant ink and the areas that will not print coated with a film of water to prevent the ink from contacting the surface. Each of these printing processes require distinct inks having physical properties tailored for the specific process.

Gravure inks are very fluid, solvent or co-solvent based inks that dry by evaporation to leave a film of resin and pigment on the substrate. Representative solvents and co-solvents include toluene, xylene, alcohols, acetone, aliphatic hydrocarbons, water and the like. Except for water, the solvents and co-solvents are volatile organic compounds (VOC). Due to environmental considerations, limitations are being placed on the amount of VOC emissions that occur during printing. Solvent recovery systems or incinerators are utilized to reduce the VOC emissions but treat the effect rather than the cause of the problem.

Waterborne inks that includes as solvents water and a co-solvent, e.g., alcohols, emit less VOC than solvent based inks. The co-solvent improves the printability of waterborne inks by reducing the surface tension. The relatively large amount of co-solvent required to reduce the surface tension result in a waterborne ink having a very high VOC content.

True waterbased gravure inks, i.e., inks that only use water as a solvent and do not include a co-solvent, provide poor print quality. The printed paper is roughened because the ink wets and swells the paper fibers. The print is rough and grainy because of the roughening and also because the chemical formulation of the ink results in poor ink transfer to the paper, poor ink dot spreading on the paper and poor trapping, i.e., over printing, of one ink on another. Thus, the printability is poor.

Waterbased gravure inks can also include volatile surfactants and defoamers. Unfortunately these surfactants and defoamers are inefficient and require relatively large dosages, e.g., 2 weight percent. (wt %)per component, which adds to the VOC content of the ink. A waterbased gravure ink having a low VOC content and that provides good print quality is desirable.

SUMMARY OF THE INVENTION

In accordance with this invention, an improved waterbased gravure ink has an additive package that includes at least one supplement, an optional nonvolatile cyclic amide solvent capable of dissolving polar and nonpolar supplements, a nonionic siloxane surfactant and a nonionic polyoxyalkylenated surfactant, the at least one supplement being selected from the group of polysiloxane copolymers, waterborne polyamides, higher alcohols, polyhydric alcohols, phosphate compounds and terpenes. Preferably, the amide solvent is utilized. The polysiloxane copolymer can be both the supplement and the nonionic siloxane surfactant. Alternatively, when the copolymer is not a siloxane surfactant a distinct siloxane surfactant is used.

The waterbased ink includes a resin vehicle, a dispersed resin phase and a colorant.

The cyclic amide solvent, surfactants and supplements are either nonvolatiles or have a low volatility thereby resulting in the ink having a low volatile organic compound (VOC) content as compared to conventional gravure inks.

The solvent and surfactants help produce a homogeneous ink by solubilizing supplements that are not readily soluble in water.

The supplements are presently theorized to improve printability, i.e., the ability to print, and trapping, i.e., over-printing, of one ink on another, by lowering the surface tension of the ink to increase the rate the ink is transferred from the cell to the substrate, the amount of ink transferred from the cell and the rate the ink dot spreads on the substrate. When the substrate is paper, the ink seals the paper to prevent roughening.

The ink has a VOC content of less than about 5 weight percent (wt %) based on the total weight of the ink. Preferably, the VOC content is less than about 3 wt %.

The method of printing includes the steps of introducing the ink into gravure cells defined in a printing surface and transferring the ink to a substrate. The cells are engraved in the surface with a 120° to 150° diamond and about 120 to about 300 lines per inch.

The ink and method of printing using the ink provide many attributes that the industry desires and overcome shortcomings of the known water-containing gravure inks and methods of printing.

Numerous other advantages and features of the present invention will become readily apparent from the following detailed description of the preferred embodiments and the appended claims.

DETAILED DESCRIPTION OF THE PREFERRED EMBODIMENTS

Although this invention is susceptible to embodiment in many different forms, described herein in detail are presently preferred embodiments. It should be understood, however, that the present disclosure is to be considered as an exemplification of the principles of this invention and is not intended to limit the invention to the embodiments described.

The invention is directed to an improved waterbased gravure ink, which includes an additive package, that is suitable for printing on a substrate such as paper. The additive package includes at least one supplement, an optional nonvolatile cyclic amide solvent capable of dissolving polar and nonpolar supplements, a nonionic siloxane surfactant and a nonionic polyoxyalkylenated surfactant. The at least one supplement is selected from the group of polysiloxane copolymers, waterborne polyamides, higher alcohols, polyhydric alcohols, phosphate compounds and terpenes. The polysiloxane copolymer can be the supplement and the siloxane surfactant. Preferably, the amide solvent is utilized.

The term "nonvolatile", as used in its various grammatical forms, indicates that the subject of the term will not volatilize typically more than 5% of its dosage when a U.S.E.P.A. Reference Method 24A test is performed. U.S.E.P.A. Reference Method 24A is for the "Determination of Volatile Matter Content and Density of Printing Inks and Related Coatings.

The ink has a volatile organic compound (VOC) content of less than about 5, preferably less than about 3, weight percent (wt %) based on the total weight of the ink.

The invention is also directed to a method of printing on a printing substrate using the ink and a printing surface having gravure cells defined therein. The cells are prepared using a about 120° to 150°, preferably about 130° to 140°, diamond to engrave about 120 to about 300, preferably about 150 to about 225, lines per inch.

The waterbased gravure ink includes a resinous vehicle, a dispersed resin phase, and a colorant. The resinous vehicle can be obtained by making an acid resin, e.g., a methacrylic acid resin, soluble in water through the formation of an alkaline salt using a relatively volatile amine such as ethanolamine or ammonia. The resinous vehicle reacts with the paper to give good adhesion and also contributes to good film formation. The dispersed resin phase, e.g., an acrylic latex or a highly dispersed acrylic polymer, increases the speed at which the ink dries on the substrate and gives good film formation on the substrate. The colorant, e.g., pigments, dyes and the like, is dispersed or dissolved in the vehicle.

The cyclic amide solvent is effective in dispersing waterbased colorants and helping to maintain the resins of the ink in solution in the presence of the supplement. The cyclic amide solvent also reduces the surface tension of the water and acts as a leveling agent for the resins to increase ink dot spread on the substrate.

The siloxane surfactant is preferably a polysiloxane copolymer surfactant. The siloxane surfactant acts as a wetting agent, surfactant, leveling agent, and dispersant, and adds no VOC content to the mixture.

The polyoxyalkylenated nonionic surfactant is effective as a wetting agent, leveling agent and dispersant, is low foaming and is not a VOC. Significant improvements in the printing smoothness and ink trapping of the ink as compared to conventional waterbased gravure inks is obtained using this surfactant. The very low volatility of this surfactant makes it highly desirable.

Use of cyclic amide solvent, siloxane surfactant and polyoxyalkylenated surfactant can reduce the VOC content of the ink due to the solvent and surfactants by a factor of about 20 or more as compared to conventional solvents and surfactants.

The polysiloxane copolymer is effective either as a surfactant or a defoamer of the ink. If the polysiloxane copolymer is not a siloxane nonionic surfactant separate surfactant is used.

The higher alcohols reduce the surface tension of the ink dot to increase ink dot spread.

The polysiloxane copolymer surfactant can be utilized with higher alcohols to lower the amount of the higher alcohol while still achieving significantly improved surface tension reduction. This lowering of the amount of higher alcohol enables the higher alcohol to be utilized without appreciably increasing the VOC content.

Some waterborne polyamides dissolve in water in amounts up to 30 wt % without the use of a co-solvent that increase the VOC content. The use of these polyamides results in improved gloss and assists in the wetting and dispersion of the pigment in the ink. Their low volatility makes the waterborne polyamides desirable for increasing the printability of the ink without increasing the VOC content.

Polyhydric alcohols improve the printing smoothness and trapping of the ink, the dispersing of the colorant and act as a leveling agent to improve ink transfer from the gravure cells to the printing substrate.

Phosphate compounds act as pigment dispersants.

Terpenes are used to dissolve pigment.

Suitable resinous vehicles are JONCRYL 57 and JONCRYL 61LV acrylic resin solutions both commercially available from S. C. Johnson Co., 1525 Howe St., Racine, Wis. 53403-5011.

Suitable dispersed resin phases are JONCRYL 134, JONCRYL 135 and JONCRYL 138 acrylic polymer dispersions commercially available from S. C. Johnson Co.

The colorants are conventional and readily commercially available.

Representative cyclic amides include m-pyrole, methanamide, and the like.

Representative polysiloxane copolymers include the nonionic surfactant TEGO WET 250 (a polysiloxane copolymer surfactant) and the defoamer TEGO FOAMEX 810 (a polysiloxane copolymer that is not a surfactant), both commercially available from Tego-Chemie, Hopewell, Va.

Representative polyoxyalkylenated nonionic surfactants have two to four carbon atoms in the alkyl group and include a polyoxyethylenated nonionic surfactant such as SURFACTOL 365 and SURFACTOL 380, both commercially available from CasChem Inc., Bayonne, N.J.

Representative higher alcohols include n-amyl alcohol, 2-ethylhexanol, n-hexyl alcohol, n-octyl alcohol, methylamyl 2-heptyl alcohol, isodecyl alcohol, tridecyl alcohol, the ALFOL series 4 to 1012 of monohydric alcohols commercially available from Visa Chemical; Houston, Tex., fatty alcohols, ethoxylated alcohols and the like.

Representative waterborne polyamide includes the thermoplastic polyamides GAX 11-972, GAX 11-973, GAX 12-154 and GAX 12-265 commercially available from Henkel Polymers Div. LaGrange, Ill.

Representative polyhydric alcohols including glycerol, 1, 2 - propylene glycol, pentaerythritol and the like.

Representative phosphate compounds including sodium phosphate tribasic, sodium phosphate monobasic, sodium phosphate dibasic and the like.

Optionally, the gravure ink can include a wax emulsion such as JONWAX 26 polyethylene wax emulsion commercially available from S. C. Johnson Co. to increase the lubricity of the ink.

The components of the gravure ink, not including the additive package, can be present in the following wt %s based upon the weight of the ink without the additive package: about 10 to about 30 wt % of the resinous vehicle; about 25 to about 55 wt % of the dispersed resin phase; about 10 to about 40 wt % of the colorant; about 15 to about 40 wt % of water; and up to about 15 wt % of the wax emulsion.

The additive package can be admixed to one or all of the other components of the ink. Preferably, the amide solvent and the siloxane and polyoxyalkylenated surfactants are first admixed either with the supplement or with the other components prior to admixing the supplement with the other components.

The additive package preferably contains about equal weight percents of the amide solvent, siloxane surfactant, polyoxyalkylenated surfactant and supplement.

The additive package is used in the ink in an amount effective to improve the printability as compared to a conventional gravure ink. The additive package is preferably present in the ink in an amount in the range of about 0.5 to about 5, more preferably about 0.5 to about 1, wt % based on the total weight of the ink. The other components of the gravure ink are preferably present in the ink in an amount in the range of about 99.5 to about 95, more preferably about 99.5 to about 99, wt %.

The method of printing on a substrate using the waterbased gravure ink includes the steps of introducing the waterbased gravure ink into a gravure cell that is defined in a printing surface and applying the ink from the cell to the printing substrate. The printing surface is prepared using about a 120° to 150°, preferably about a 130° to 140°, diamond for engraving about 120 to about 300, preferably about 150 to about 225, lines per inch for cyan, magenta, yellow and key (black) colors. Smoother printing is obtained using the selected diamond cutting angle and lines per inch. The printing surface can be on a flat plate but is preferably on a cylinder.

The following EXAMPLES are provided by way of illustration and not by way of limitation.

EXAMPLE 1

Formulation Including Components of the Gravure Ink Other than the Additive Package Formulation 1 provided in TABLE I, below, includes components of the gravure ink other than the additive package. The components can be admixed together prior to admixing the additive package therewith.

TABLE I

| FORMULATION INCLUDING COMPONENTS OF THE GRAVURE INK WITHOUT THE ADDITIVE PACKAGE | |
|---|---|
| COMPONENTS | AMOUNT (WT %) |
| Furnace black, e.g., RAVEN 890 | 15 |
| JONCRYL 61 LV acrylic resin solution | 25 |
| Water | 19 |
| JONCRYL 138 acrylic polymer dispersion | 31 |
| JONWAX 26 polyethylene wax emulsion | 10 |

EXAMPLE 2 Procedure for Preparing the Ink

The components of the ink are introduced into a suitable container, with agitation, preferably in the following order: resinous vehicle; defoamer; amide solvent; polysiloxane surfactant; polyoxyalkylenated surfactant; supplement; colorant; and dispersed resin phase.

This invention has been described in terms of specific embodiments set forth in detail. It should be understood, however, that these embodiments are presented by way of representation only, and that the invention is not necessarily limited thereto. Modifications and variations within the spirit and scope of the claims that follow will be readily apparent from this disclosure, as those skilled in the art will appreciate.

EXAMPLE 3

Addition of Additive Package to a Formulated Ink

The VOC content (wt %) of a Flint Ink Company's water-based gravure ink was found to be 4.7% using U.S.E.P.A. Method 24A. A significant improvement in printing smoothness was found when 1% (wt %) of an additive package containing equal parts of a cyclic amide (M-Pyrole), a poloxyakylenated surfactant (SURFACTOL 318), a poloxysilane copolymer surfactant (TEGO WET 250), and a higher alcohol (2-Ethyl-1-Hexanol) with an increase of only 0.5% in the measured VOC content. Further, using U.S.E.P.A. Method 24A, Table II shows the measured VOC content of each of the supplements used.

TABLE II

| VOC CONTENT OF EACH SUPPLEMENT | |
|---|---|
| ADDITIVE | VOC CONTENT (WT %) |
| SURFACTOL 318 (Poloxyalkylenated surfactant) | 0.5 |
| TEGO WET 250 (Polyoxysilane copolymer surfactant) | 0.0 |
| M-Pyrole | 0.5 |
| 2-Ethyl-1-Hexanol | 0.5 |

What is claimed:

1. In a waterbased gravure ink having a resinous vehicle, the improvement comprising the addition of an additive package comprising a siloxane nonionic surfactant and polyoxyalkylenated nonionic surfactant.

2. The ink of claim 1 wherein the additive package further comprises:
   at least one supplement selected from the group consisting of polysiloxane copolymers, waterborne polyamides, higher alcohols, polyhydric alcohols, phosphate compounds and terpenes, the polysiloxane copolymers, if present, being distinct from the siloxane surfactant; and
   an optional nonvolatile cyclic amide solvent.

3. The ink in accordance with claim 2 wherein the cyclic amide solvent is m-pyrole, the siloxane surfactant is a polysiloxane copolymer surfactant and the alkyl group of the polyoxyalkylenated surfactant contains two to four carbon atoms.

4. The ink in accordance with claim 3 wherein the supplement is one of the waterborne polyamides.

5. The ink in accordance with claim 3 wherein the supplement is one of the higher alcohols.

6. The ink in accordance with claim 3 wherein the supplement is one of the polyhydric alcohols.

7. The ink dance with claim 3 wherein the supplement is one of the phosphate compounds.

8. The ink in accordance with claim 3 wherein the supplement is one of the terpenes.

9. The ink in accordance with claim 1 wherein the additive package is present in an amount in the range of about 0.5 to about 5 weight percent, based on the total weight of ink.

10. The ink in accordance with claim 1 wherein the additive package is present in an amount in the range of about 0.5 to about 1 weight percent, based on the total weight of ink.

11. The ink in accordance with claim 1 wherein the ink has a volatile organic compound content of less than about 5 weight percent based on the total weight of the ink.

12. The ink in accordance with claim 1 wherein the ink has a volatile organic compound of less than about 3 weight percent based on the total weight of the ink.

13. The ink in accordance with claim 2 wherein the additive package is present in an amount in the range of about 0.5 to about 1 weight percent, based on the total weight of ink.

14. The ink in accordance with claim 2 wherein the ink has a volatile organic compound content of less than about 3 weight percent, based on the total weight of the ink.

15. The ink in accordance with claim 2 wherein the additive package contains about equal weight percents of solvent, siloxane surfactant, polyoxyalkylated surfactant and supplement.

16. In a waterbased gravure ink having a resinous vehicle, the improvement comprising the addition of an additive package comprising a polysiloxane copolymer nonionic surfactant and polyoxyalkylenated nonionic surfactant having two to four carbons in the alkyl group, the ink having a volatile organic compound content of less than about 5 weight percent based on the total weight of the ink.

17. The ink in accordance with claim 16 wherein the additive package further comprises:
at least one supplement selected from the group consisting of polysiloxane copolymers, waterborne polyamides, higher alcohols, polyhydric alcohols, phosphate compounds and terpenes, the polysiloxane copolymers, if present, being distinct from the polysiloxane copolymer nonionic surfactant; and
a m-pyrole.

18. In a method of printing using a waterbased gravure ink having a resinous vehicle, and an additive package comprising a siloxane nonionic surfactant and a polyoxyalkylenated nonionic surfactant, the method comprising the steps of:
introducing the ink into cells of a printing surface prepared using about a 120° to 150° diamond and being engraved with about 120 to about 300 lines per inch; and
transferring the ink in the cells to the printing substrate.

19. The method in accordance with claim 18 wherein the printing surface is prepared using about a 130° to 140° diamond and is engraved with about 150 to about 225 lines per inch.

20. The method in accordance with claim 18 wherein the ink further comprises:
at least one supplement selected from the group consisting of polysiloxane copolymers, waterborne polyamides, higher alcohols, polyhydric alcohols, phosphate compounds and terpenes, the polysiloxane copolymers, if present, being distinct from the siloxane surfactant; and
an optional nonvolatile cyclic amide solvent.

* * * * *